United States Patent
Islam et al.

(10) Patent No.: US 10,984,412 B2
(45) Date of Patent: Apr. 20, 2021

(54) SYSTEM AND METHOD FOR MANAGEMENT OF CRYPTOCURRENCY SYSTEMS

(71) Applicant: Coinbase, Inc., San Francisco, CA (US)

(72) Inventors: Shamiq Islam, Oakland, CA (US); Mark Nesbitt, Oakland, CA (US); Don Yu, Park City, UT (US); Saroja Erabelli, McClean, VA (US)

(73) Assignee: Coinbase, Inc., San Francisco, CA (US)

( * ) Notice: Subject to any disclaimer, the term of this patent is extended or adjusted under 35 U.S.C. 154(b) by 35 days.

(21) Appl. No.: 16/576,571

(22) Filed: Sep. 19, 2019

(65) Prior Publication Data

US 2020/0097953 A1 Mar. 26, 2020

Related U.S. Application Data

(60) Provisional application No. 62/734,135, filed on Sep. 20, 2018.

(51) Int. Cl.
*G06Q 20/36* (2012.01)
*G06Q 20/06* (2012.01)

(52) U.S. Cl.
CPC ..... *G06Q 20/3678* (2013.01); *G06Q 20/0658* (2013.01); *G06Q 20/3672* (2013.01); *G06Q 20/3674* (2013.01)

(58) Field of Classification Search
None
See application file for complete search history.

(56) References Cited

U.S. PATENT DOCUMENTS

| | | | | |
|---|---|---|---|---|
| 10,762,229 | B2* | 9/2020 | Sion | G06F 21/6218 |
| 2016/0248809 | A1* | 8/2016 | Smith | H04L 63/0435 |
| 2019/0012660 | A1* | 1/2019 | Masters | G06Q 20/381 |
| 2019/0012663 | A1* | 1/2019 | Masters | G06Q 20/10 |
| 2019/0132350 | A1* | 5/2019 | Smith | H04L 41/22 |
| 2019/0332691 | A1* | 10/2019 | Beadles | G06Q 20/065 |
| 2019/0349423 | A1* | 11/2019 | Xin | G06F 9/5072 |
| 2019/0354729 | A1* | 11/2019 | Krawczewicz | H04L 9/32 |
| 2020/0250549 | A1* | 8/2020 | Kikinis | H04L 9/3239 |

OTHER PUBLICATIONS

"Alethio: Lighting Up the Blockchain with Real Time Data", https://media.consensys.net/alethio-lighting-up-the-blockchain-with-real-time-stats-a80bb30576db, Mar. 6, 2018, 9 pages.
"Blockchain Monitoring, Actively monitor any external account, app or smart contract", Advanced Analytics for the Ethereum Blockchain, Alethio, https://company.aleth.io/blockchain-monitoring, 4 pages.
"Chainalysis", https://www.chainalysis.com, 2019.
"Ethereum Network Status", https://ethstats.net.
"Generate meaningful knowledge from Ethereum", Alethio Reports, https://reports.aleth.io, 8 pages.
Lintilhac, Paul , "Using Machine Learning to Understand the Ethereal Blockchain", ConsenSys, https://media.consensys.net/using-machine-learning-to-understand-the-ethereum-blockchain-1778485d603a, Apr. 3, 2018, 8 pages.
Milano, Annaliese , "Coindesk Chainalysis Raises $16 Million for Real-Time Crypto Compliance", https://www.coindesk.com/chainalysis-raises-16-million-for-real-time-crypto-compliance, Apr. 5, 2018.

* cited by examiner

*Primary Examiner* — Firmin Backer
(74) *Attorney, Agent, or Firm* — Jeffrey Schox; Diana Lin

(57) ABSTRACT

Systems and methods for managing cryptocurrency systems.

20 Claims, 7 Drawing Sheets

SYSTEM AND METHOD FOR MANAGEMENT OF CRYPTOCURRENCY SYSTEMS

CROSS-REFERENCE TO RELATED APPLICATIONS

This application claims priority to U.S. Provisional Application No. 62/734,135 filed 20 Sep. 2018, which is incorporated herein in its entirety by this reference.

TECHNICAL FIELD

This invention relates generally to the cryptocurrency security field, and more specifically to a new and useful system and method for management of cryptocurrency systems.

BACKGROUND

Use of cryptocurrency often involves interaction of cryptocurrency systems with a blockchain network. Blockchain networks can have complicated failure modes, which are often silent and implicit rather than readily identifiable. Moreover, cryptocurrency systems, such as wallets, often operate in accordance with operating parameters, such as a number transaction confirmation requirements required for each transaction.

Thus, there is a need in the cryptocurrency security field to create a new and useful system and method for management of cryptocurrency systems that interact with blockchain networks. The disclosure herein provides such new and useful system and method.

DESCRIPTION OF THE PREFERRED EMBODIMENTS

The following description of the preferred embodiments is not intended to limit the invention to these preferred embodiments, but rather to enable any person skilled in the art to make and use this invention.

1. Overview

Cryptocurrency networks can have complicated failure modes, many of which may not be explicitly obvious and do not exist in other technology spaces. While these failures can be valuable to detect and/or predict for security purposes, these failures are often silent and implicit rather than explicit or identified to the cryptocurrency network as a failure mode, rendering them difficult to identify in real time. Furthermore, these failures are conventionally only detectable and resolvable once they have occurred in high volume or over larger surface areas.

While some rudimentary cryptocurrency failure detection architectures exist, these architectures are oftentimes hard-coded for each asset, and cannot be dynamically expanded or adjusted as new assets are added to the monitored asset set or as new failures arise. As such, conventional detection architectures are not well suited for constant multi-asset monitoring at scale.

Moreover, operating parameters for conventional cryptocurrency systems are not ordinarily set in accordance with detection of cryptocurrency failure.

Figure 1A:
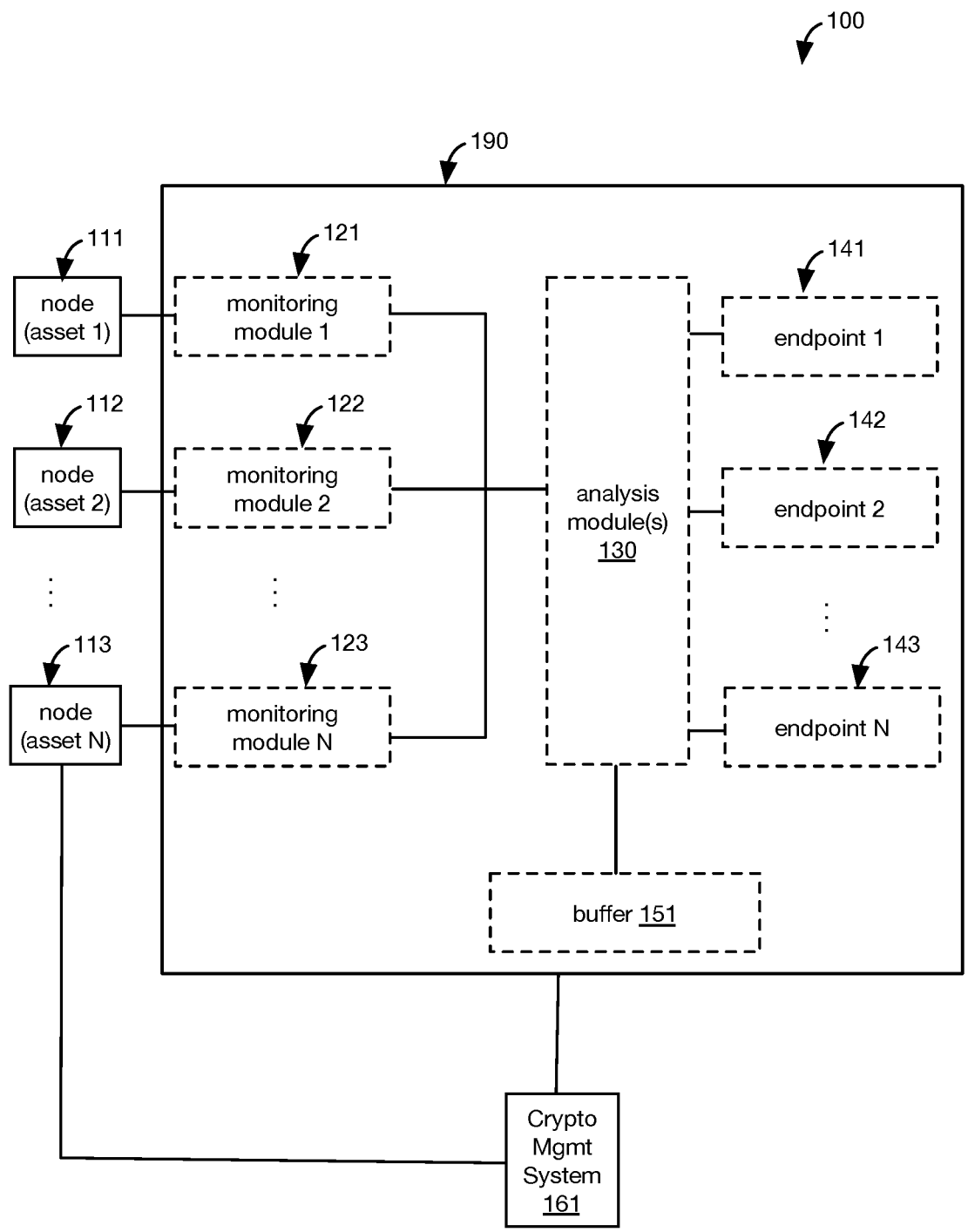
FIG. 1A is a schematic representation of the system.
Figure 1B:
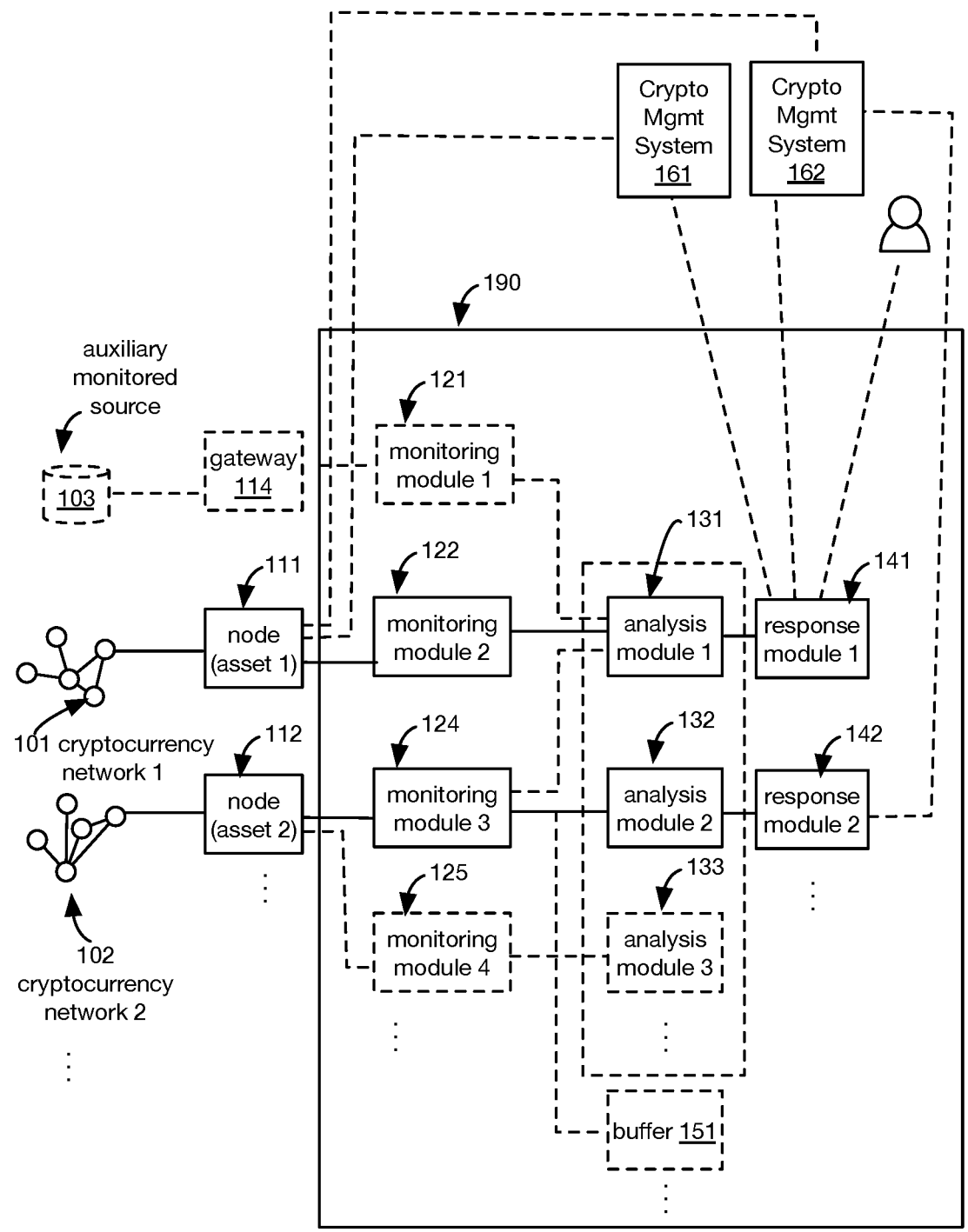
FIG. 1B is a schematic representation of an example of the system.

FIGS. 1A-B show schematic representations of a system, in accordance with embodiments.

In some variations, the system (e.g., 190) includes at least one monitoring module (e.g., 121-125). In some implementations, at least one monitoring module (e.g., 121-125) functions to interact with at least one cryptocurrency network (e.g., 101, 102 shown in FIG. 1B). In some variations, the system (e.g., 190) includes at least one analysis module (e.g., 130 shown in FIG. 1A, 131-133 shown in FIG. 1B) communicatively coupled to at least one monitoring module (e.g., 121-125). In some variations, the system optionally includes at least one endpoint (e.g., 141-143) that is communicatively coupled to at least one analysis module (e.g., 130 shown in FIG. 1A, 131-133 shown in FIG. 1B). In some variations, endpoints include at least one of notification endpoints and response modules. In some implementations, at least one endpoint is communicatively coupled to at least one cryptocurrency management system (e.g., a cryptocurrency wallet, a cryptocurrency exchange, etc.). In some variations, the system includes at least one buffer (e.g., 151) that is communicatively coupled to at least one analysis module. In some implementations, the system is modular, such that a new set of monitoring modules (and/or associated analysis modules) can be dynamically added to the system for each new cryptocurrency network (e.g., asset) that is added to the set of assets supported by the entity, but can alternatively be substantially static.

In some variations, the system functions to monitor cryptocurrency networks (e.g., 101, 102) for failures or high-risk activities. In some implementations, the system functions to determine the risk of an attack on an entity or cryptocurrency management system (e.g., a cryptocurrency asset exchange, a cryptocurrency custodian, etc.), but can be used to determine any other suitable risk. Examples of failures or risks include: changes to canonical transaction history (e.g., due to a 51% attack), the probability or risk of the change to a canonical transaction, a change to the mechanisms of control over crypto balances (i.e. minting, pausing transferring), a change to the source code underlying the cryptocurrency asset, large deposits (e.g., wherein the profitability from an attack can exceed the cost of attack), protocol attacks, network level attacks, double-spend attacks (e.g., a 51% attack; selfish mining, transaction cancellation, double spending, random forking) and/or the profitability of such an attack, unexpected supply increases, orphaned blocks, pool cannibalization, timejacking, soft forks, Sybill attacks, Finney attacks, race attacks, bulk asset purchasing, geopolitical attacks, eclipse attacks, routing attacks, infrastructure attacks, botnet attacks, selfish mining, or other cryptocurrency manipulation attacks. Different cryptocurrency networks (e.g., networks for different cryptocurrency assets) can be monitored for different attacks, wherein the set of attacks associated with a given cryptocurrency asset can be: manually determined, empirically determined, reactively determined (e.g., an attack is added to the monitored set after it is first detected on a cryptocurrency network), determined based on the asset's underlying protocol (e.g., characteristics, language, type, etc.), or otherwise determined.

In some variations, the system can optionally: identify or classify failures as they arise, assess the risk of each failure, and/or trigger notifications based on the parameters of each failure. In some variations, system provides a modularized platform that allows dynamic expansion or adjustment as new assets are added to the monitored cryptocurrency network set, or as new failure modes arise.

In some variations, the method includes at least one of: monitoring blockchain data; generating analysis results; and performing an action. In some implementations, performing an action includes setting at least one operating parameter for at least one cryptocurrency management system. In some variations, the method includes determining at least one operating parameter (e.g., number of confirmations) for at least one cryptocurrency management system. In some variations, the method includes updating at least one operating parameter (e.g., number of confirmations) for at least one cryptocurrency management system (e.g., based on the monitoring, the analysis results, etc.).

Figure 4:
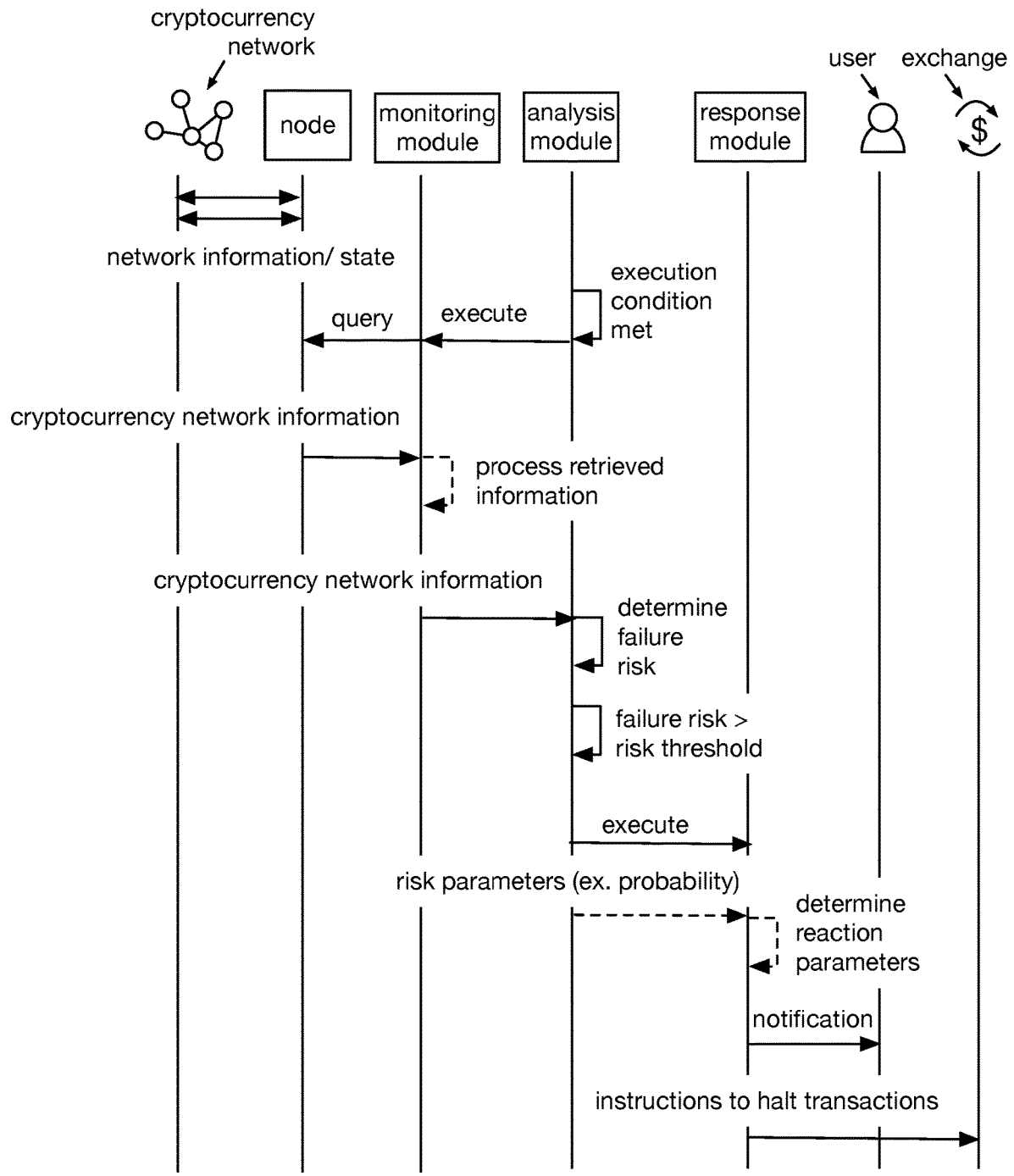
FIG. 4 is a schematic representation of a second example of data flow through the system.

In some variations, operation of the system includes at least one of: executing the analysis modules, wherein each analysis module is associated with a predetermined set of monitoring modules, and wherein each monitoring module is communicatively coupled to a monitored source, such as a cryptocurrency network; upon analysis module execution, at each of the predetermined set of monitoring modules: determining a predetermined set of information from the respective coupled monitored source and supplying the determined information set to the analysis module; at the analysis module: determining an event probability or event risk based on the determined information, and, in response to the event probability or risk satisfying a predetermined condition (e.g., event probability or risk exceeding a probability or risk threshold), executing a predetermined action (e.g., notification transmission, halting transactions for the cryptocurrency asset, setting or updating operating parameters of a cryptocurrency management system, etc.) that is associated with the analysis module and/or event probability or risk range (example shown in FIG. 4).

In some variations, operation of the system includes at least one of: at each monitoring module: continuously determining a predetermined set of information from the monitored source; storing the determined information set in a database (e.g., off-chain database); and asynchronously executing the analysis modules, wherein the analysis modules pull the requisite information from the database for analysis. Upon satisfaction of a predetermined condition (e.g., event probability or risk exceeding a probability or risk threshold), the analysis module can selectively execute a predetermined action associated with the analysis module and/or event probability or risk range. However, the system can be otherwise operated.

Figure 3:
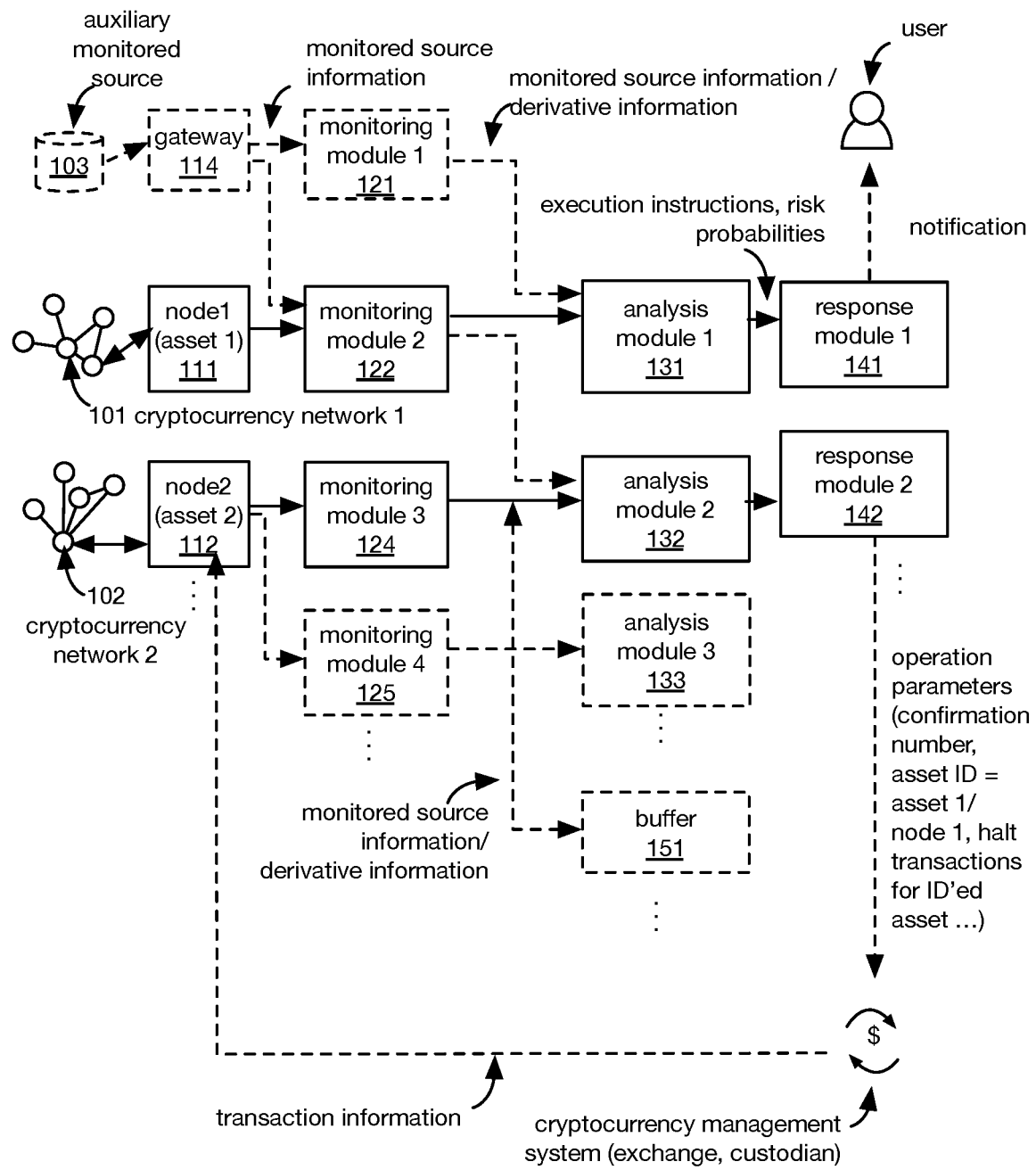
FIG. 3 is a schematic representation of an example data flow through the system example of FIG. 1B.

In some variations, operation of the system includes at least one of: with at least one monitoring module: determining a predetermined set of information (e.g., monitored source information, derivative information) from a respective monitored source; executing at least one analysis module to generate at least one of execution instructions and a risk probability; upon satisfaction of a predetermined condition (e.g., event probability or risk exceeding a probability or risk threshold), the analysis module can selectively execute a predetermined action (e.g., provide a notification, set operation parameters, halt sending of transaction information to a node of a cryptocurrency network, etc.) associated with the analysis module and/or event probability or risk range (example shown in FIG. 3). However, the system can be otherwise operated.

In some variations, the system, or components thereof (e.g., monitoring modules, analysis modules, etc.), are preferably generated once, but can alternatively be generated or updated: iteratively, ad hoc, upon satisfaction of a regeneration condition (e.g., the failure detection accuracy falling below a threshold value), or at any suitable time. In some variations, the modules of the system can optionally be iteratively updated or refined. For example, in some implementations, the system can determine anticipated events (e.g., risk events); store the underlying data contributing to the event prediction; in response to future event occurrence, label the underlying data with the event; and in response to future event nonoccurrence (e.g., within a predicted time window), label the underlying data as false for the event; wherein the labeled data can be used as labeled training data for supervised learning (e.g., to generate an updated event prediction analysis module).

In some variations, the system and/or components thereof can be determined (e.g., created, generated): manually, semi-automatically (e.g., automatically, with manual checks or curation), automatically (e.g., learned using a training data set, etc.), or otherwise determined. In some variations, the system, or components thereof, can be executed: on a predetermined schedule (e.g., based on the block creation rate), upon occurrence of an execution event (e.g., wherein a first analysis module can trigger execution of a second analysis module as an output), or at any suitable time. In some variations, the system components (e.g., analysis modules, monitoring modules, etc.) are preferably executed in parallel (e.g., wherein multiple assets are concurrently monitored by the same or different instances of the method), but can alternatively or additionally be executed in series or in any other suitable order.

2. Benefits

The system can confer several benefits over conventional systems.

First, the system can simplify setting and/or updating of operation parameters for cryptocurrency management systems. An initially set operating parameter for a specific cryptocurrency asset can be automatically updated based on detection of a failure at a cryptocurrency network for the asset. For example, if certain failures are detected for an asset, a number of confirmations required by a hot wallet for the asset can be automatically increased, thereby improving security.

Second, the system can detect failures specific to cryptographic assets and/or cryptocurrency networks. As such, the system presents technological solutions that are necessarily rooted in computer technology (e.g., specialized monitoring systems and components thereof), to overcome issues specifically arising in computer technology (e.g., cryptocurrency network failures, examples of which are discussed below). Furthermore, the system presents improvements to computer-related technology (e.g., secondary systems reliant upon cryptocurrency networks) by leveraging non-generic data (e.g., cryptocurrency network data) to decrease the risk borne by said secondary systems.

In a first example, the system can identify (and/or determine the probability of) failures stemming from the consensus-based nature of many cryptocurrency networks, such as double-spend (e.g., spending the same cryptocurrency asset more than once) or other failures. For example, the system can identify orphaned blocks (and/or the orphaning of said blocks) by reading and storing the blockchain state from the cryptocurrency network; identify which chains are vulnerable to double-spend attacks (e.g., based on the profitability vs. the cost of the attack); determine when a network partition has occurred by monitoring Internet connectivity metrics, geopolitical metrics, energy metrics, or other infrastructure metrics; or determine any other suitable disagreement-based attack.

In a second example, the system can identify (and/or determine the probability of) failures resulting from the open source nature of the underlying cryptocurrency protocols and/or the lag in cryptocurrency nodes adopting new versions of the cryptocurrency protocol. In a specific example, the system can detect codebase changes, such as by monitoring key sections of the source code defining the cryptocurrency protocol (e.g., sections associated with transaction signing and/or broadcasting).

In a third example, the system can identify (and/or determine the probability of) failures resulting from the fact that entities cannot prevent transfers into their cryptocurrency "accounts" (e.g., cannot prevent transactions addressed to their address from being confirmed). For example, the system can: detect that the transaction has been signed (but not confirmed) and take action before transaction confirmation; determine a cost of attack (e.g., based on data and energy costs, probability of attack success, etc.), compare the attack cost to the amount transferred in, and take action based on the comparison; or otherwise manage risks arising from an inability to preclude inbound cryptocurrency transfers.

In a fourth example, the system can identify (and/or determine the probability of) failures resulting from the fact that the value of cryptographic assets, such as tokens, can be dictated by smart contracts executing on the cryptographic networks. For example, the system can anticipate or determine token depreciation by monitoring key calls and/or activity (e.g., ERC20 token contract calls and/or activity) executed by key smart contracts associated with a token. In a specific example, the system can determine a high risk of token depreciation when a particular set of calls are called by the smart contract, and can automatically halt transactions on the associated cryptocurrency network.

Third, the system can confer higher-fidelity risk analysis, predict failures before they occur, detect failures sooner (e.g., in real- or near-real time), detect failures with less on-chain data, or confer other benefits over conventional systems by monitoring multiple dynamic and/or static information sources in addition to asset information (e.g., cryptocurrency networks) for the information indicative of failure events, such electricity costs, data costs, communication infrastructure health, source code, health metrics of other entities (e.g., other cryptocurrency management systems, etc.), or any other suitable auxiliary source (e.g., 103 shown in FIG. 1B).

Fourth, the system can automatically dynamically respond to detected or anticipated failures, based on the failure: type, probability, degree, or other failure parameter. For example, the system can selectively identify cryptocurrency addresses when an attack probability associated with said cryptocurrency addresses exceeds a predetermined threshold, and interact with cryptocurrency management system components to ensure that the cryptocurrency management system is not vulnerable to malicious activity associated with the address (e.g., by selectively halting cryptocurrency management system interaction with the cryptocurrency address. In a second example, the system can selectively cease transactions with the network altogether (e.g., by pausing transaction transmission to the mining pool, by disconnecting the asset's node from the internet, etc.) when a change to a key section of the source code or a network partition is detected.

Fifth, the system can determine operation parameters that minimize the risk of failure or attack. For example, the system can use historic data, collected for orphaned block detection and/or chain reorganization detection, to determine the threshold number of confirmations (e.g., threshold number of confirmed blocks) before a transaction can be considered "confirmed" and the associated funds can be released. In a first specific example, the number of confirmations can be a linear multiple of the previous confirmation threshold. However, the operation parameters can be otherwise determined.

However, the system and method can confer any suitable set of benefits over conventional systems.

3. System

In some variations, a system (e.g., 190) includes at least one monitoring module (e.g., 121-125). In some implementations, at least one monitoring module (e.g., 121-125) functions to interact with at least one cryptocurrency network (e.g., 101, 102 shown in FIG. 1B). In some variations, the system (e.g., 190) includes at least one analysis module (e.g., 130 shown in FIG. 1A, 131-133 shown in FIG. 1B) communicatively coupled to at least one monitoring module (e.g., 121-125). In some variations, the system 190 optionally includes at least one endpoint (e.g., 141-143) that is communicatively coupled to at least one analysis module (e.g., 130 shown in FIG. 1A, 131-133 shown in FIG. 1B). In some variations, endpoints include at least one of notification endpoints and response modules. In some implementations, at least one endpoint is communicatively coupled to at least one cryptocurrency management system (e.g., a cryptocurrency wallet, a cryptocurrency exchange, etc.). In some variations, the system includes at least one buffer (e.g., 151) that is communicatively coupled to at least one analysis module.

Figure 6:
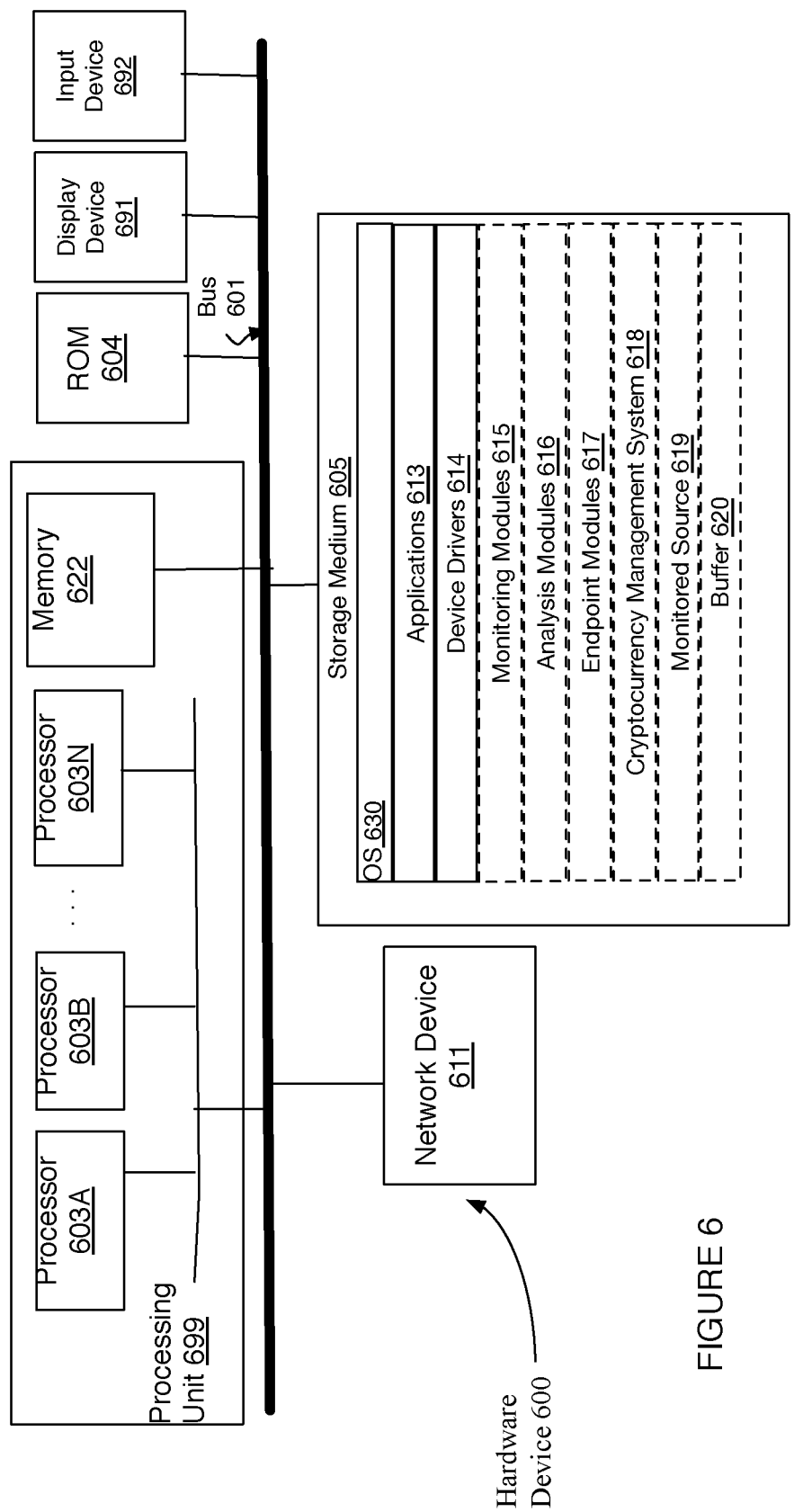
FIG. 6 is a schematic representation of hardware device.

In some implementations, the system 190 is implemented by one or more computing servers (e.g., 600 shown in FIG. 6) having one or more computer processors (e.g., graphics processor units (GPU), tensor processing unit (TPU), central processing units (CPUs, MCUs, etc.), or a combination of web servers and private servers). In some implementations, at least one component of the system (e.g., 111-113, 121-123, 131-133, 141-142) is implemented by one or more computing servers (e.g., 600 shown in FIG. 6) having one or more computer processors (e.g., graphics processor units (GPU), tensor processing unit (TPU), central processing units (CPUs, MCUs, etc.), or a combination of web servers and private servers).

In some variations, the system 190 is configured to monitor one or more monitored sources. In some variations, monitored sources include one or more cryptocurrency networks (e.g., 101, 102), but can additionally or alternatively include: auxiliary nodes (e.g., 103 shown in FIG. 1B) (e.g., whitelisted nodes hosted by other entities), Internet monitoring systems (e.g., Internet Service Provider databases or outage maps), systems or databases monitoring government health or performance (e.g., news systems, economic indicator databases, etc.), energy monitoring systems (e.g., Energy Information Administration databases), source code repositories (e.g., Github, etc.), other entities (e.g., other exchanges or asset custodians; via other entities'

APIs, determined by monitoring transactions to/from entity's addresses, etc.), other blockchains, or any other suitable auxiliary monitored source (e.g., 103 shown in FIG. 1B).

In some variations, at least one monitored cryptocurrency network (e.g., 101, 102) maintains one or more cryptocurrencies (e.g., assets). The cryptocurrency network is preferably a distributed computing network (e.g., of nodes) that stores a set of transactions (e.g., in blocks) and confirms the validity of said transactions by computing solutions to a cryptographic puzzle according to a cryptocurrency protocol maintained by the cryptocurrency network. The cryptocurrency protocol is preferably open source, but can alternatively be proprietary. Examples of cryptocurrencies (and/or the associated cryptocurrency network) include: Bitcoin, Bitcoin Cash, Ethereum, Ethereum Classic, Litecoin, EOS, NEO, XRP, IOTA, ox, Zcash, Monero, or any other suitable cryptographic asset.

In some variations, at least one cryptocurrency network is monitored by connecting to a full node (e.g., 111, 112) (e.g., locally storing the complete cryptocurrency ledger) or partial node (e.g., 111, 112) (e.g., locally storing a portion of the cryptocurrency ledger) of the respective cryptocurrency network, and either reading information off of the node directly (e.g., reading the number of blocks in the blockchain, reading the transaction information from a given block, etc.) or querying the cryptocurrency network for information via the node. The node is preferably hosted by a computing system associated with the entity, but can alternatively be a whitelisted or trusted node hosted by a second entity. Alternatively or additionally, the cryptocurrency network can be monitored by reading network metrics off an online database (e.g., a mempool size aggregator, confirmation time aggregator, etc.), or otherwise determining cryptocurrency network metrics.

In some variations, the monitoring modules (e.g., 121-125) of the system function to interface with a monitored source (e.g., 111-114) to collect information associated with one or more risks. In some implementations, a monitoring module preferably reads or calls information from the monitored source, but can alternatively or additionally send information to the monitored source (e.g., updated information, etc.), or otherwise interface with the monitored source. In some implementations, the monitoring module can optionally transform the read information into a set of predetermined outputs, store the read information, or otherwise manage the determined data.

In some variations, the monitoring modules preferably each include a set of algorithms (e.g., functions, calls, transformations, etc.) configured to interface with the monitored source (e.g., wherein the functions or calls can be specific to the monitored source's protocol), but can be otherwise configured. In some implementations, the monitoring modules are preferably hosted on (and/or executed by) a remote computing system associated with the entity and/or analysis module (e.g., a server system, an off-chain system), but can alternatively or additionally be hosted: on the same system hosting the cryptocurrency node, on the cryptocurrency network (e.g., as a smart contract), or on any other suitable computing system.

In some variations, the monitoring modules are preferably executed when the connected analysis module calls the monitoring module (example shown in FIG. 4), but can alternatively or additionally be executed: periodically (e.g., at the block creation rate, at a multiple of the block creation rate, etc.), when manually called, or at any suitable time.

In some variations, the monitoring modules can each be associated with a different module type or class, wherein the module types or classes can be differentiated by: monitored source types; analysis module endpoints; retrieved variables; generated outputs; or otherwise differentiated. For example, the monitoring modules can be one of: an asset network type (e.g., that reads network variable values off a cryptocurrency node); a source code type (e.g., that monitors for changes in key sections of the cryptocurrency protocol source code); an Internet infrastructure type; and an electrical infrastructure type, wherein the asset network type can be further subdivided into failure-specific types that determine information associated with the respective failure (e.g., orphaned block type, etc.). However, the monitoring modules can be unique or custom for each piece of retrieved information.

In some variations, the monitoring modules are preferably manually created (e.g., based on inputs that the analysis modules need), but can alternatively or additionally be automatically created (e.g., from a predetermined module template, from the nonzero-weighted features used by a analysis module's neural network, etc.), or otherwise created. In one variation, each monitoring module type or class is associated with a predetermined template, wherein the predetermined template is associated with a predetermined set of variables to be called from the respective monitored source and/or a predetermined set of transformations to output to the connected analysis module(s). The predetermined template is then modified with monitored source-specific information (e.g., function calls, API calls, etc.) to interface the monitoring module with the monitored source. The monitored source-specific information can be: manually determined, retrieved from a predetermined database (e.g., associating the monitored-specific calls with the variable; a protocol library; etc.), or otherwise determined. However, the monitoring module can be otherwise generated.

In some variations, the system preferably includes multiple monitoring modules, but can alternatively include a single monitoring module. The set of monitoring modules preferably includes one or more monitoring modules for each asset (e.g., cryptocurrency network), but can alternatively include monitoring modules for a subset of the monitored assets. Each monitoring module is preferably associated with (e.g., connected to) a single monitored source, but can alternatively be associated with multiple monitored sources. Each monitoring module is preferably associated with (e.g., connected to) a single analysis module, but can alternatively be associated with multiple analysis modules. Each monitoring module is preferably disconnected from (e.g., operates independently from) other monitoring modules, but can alternatively be dependent upon or feed an output into a second monitoring module.

Examples of information (monitoring information) that can be read, generated, or output by the monitoring modules include: transaction information (e.g., transaction identifier, transaction values, transaction inputs, transaction outputs, destination addresses, transaction content, transaction timestamps, etc.), block information (e.g., block timestamp, block contents, miner, parenthash, hash, block history, block size, etc.), confirmation information (e.g., confirmation number, confirmation rate, etc.), chain size, mempool size (number of pending transactions), mining pool capacity, percentage of a mining pool mined by a given entity, transaction fees (e.g., gas), transaction fee limit, number of transactions (e.g., for an entity, IP address, cryptocurrency address, public key, hash of a public key, etc.), total output volume, channel size, block difficulty, hashrate, transaction rate (e.g., transactions per second), uncle rate, mining rate (or time between blocks), node information (e.g., current node timestamps, number of active nodes, number of syncing nodes, number of mining nodes, number of peers, uptime, etc.), root state, smart contract information (e.g., number of executed contracts, function call frequency, function identifier, entity calling the function, call variables, contract state, etc.), network information for the hosted node or auxiliary node (e.g., tried and new tables; number of connections; connection length; size of address tables; freshness of addresses in the tables; churn; entities owning the addresses appearing in the tried and new tables; etc.), source code information (e.g., source code state, whether a code section has changed, etc.; as determined from the node or a code repository), or any other suitable information.

The information can additionally or alternatively include derivative information, which can be generated from the read information and/or any other suitable information. Examples of derivative information that can be output by the monitoring modules can include: historical information, such as historic patterns or values; temporal information, such as rates of change (e.g., in the number of transactions, block generation rate, confirmation rate, etc.); state changes, such as whether the chain has been reorganized; entity information, such as which entities own the asset, how much of the asset said entity owns, and how the entity is transacting the asset; number of node restarts; or any other suitable information.

The information can additionally or alternatively include infrastructure information. Examples of infrastructure information include communication infrastructure metrics, such as Internet connection metrics (e.g., bitrate or latency, as determined by pinging a server and measuring the RTT time); energy consumption information (e.g., amount, rate, location); power costs; hardware costs; the global economic state; or any other suitable information.

In some variations, at least one analysis module of the system functions to analyze the information output by the monitoring modules. In some implementations, the analysis modules determine at least one of: whether an adverse event has occurred; the likelihood of an adverse event occurring; the actual or predicted repercussion (e.g., damage) caused by the event; and any other suitable information. Examples of adverse events include: attacks (e.g., double spending attacks, Sybill attacks, etc.), chain reorganization, block orphaning, codebase changes, network partitions, or any other suitable adverse event.

In some variations, the system preferably includes multiple analysis modules (examples shown in FIG. 1B), but can alternatively include a single analysis module. The set of analysis modules can include an analysis module for each asset (e.g., cryptocurrency network), an analysis module for each adverse event or risk (e.g., an orphaned block detector for all assets), an analysis module for each asset-risk pairing (e.g., a different orphaned block detector for each asset), a combination thereof (e.g., asset-specific analysis modules for asset-specific risks, universal analysis modules for universal risks, etc.), or any other suitable set of analysis modules. Each analysis module is preferably associated with a predetermined set of monitoring modules, but can alternatively be associated with (e.g., connected to) a single monitoring module. The connected monitoring modules are preferably each connected, in turn, to a single asset type, but can alternatively be connected to multiple asset types. The connected monitoring modules can alternatively or additionally be connected to non-cryptocurrency monitored sources, such as Internet monitoring systems or electricity monitoring systems. Each analysis module is preferably disconnected from (e.g., operates independently from) other analysis modules, but can alternatively be dependent upon or feed an output into a second analysis module.

In some variations, the analysis modules are preferably operably connected to one or more monitoring modules, and can optionally be operably connected to one or more response modules. The analysis modules can each be associated with (e.g., connected to) one or more monitoring module types or classes, wherein the monitoring module type or class is specific to the types of input required by the analysis module. However, the analysis modules can be connected to all monitoring modules (e.g., and selectively ignore or accept data supplied by different monitoring modules), be connected to a database fed by the monitoring modules (e.g., a buffer, a persistent database, etc.), or be otherwise connected to any suitable set of monitoring modules.

In some variations, the analysis module can output: a binary classification of whether an adverse event has occurred, the probability of a given adverse event occurring (e.g., the probability of the adverse event associated with the analysis module occurring), or output any other suitable output.

In some variations, the analysis modules preferably each include a set of algorithms (e.g., functions, calls, transformations, etc.) configured to receive information from the connected monitoring module(s) and transform the information into a risk-associated output, but can be otherwise configured.

In some variations, the analysis module can use one or more of: regression, classification, neural networks (e.g., convolutional neural networks), heuristics, equations (e.g., weighted equations, etc.), selection (e.g., from a library), instance-based methods (e.g., nearest neighbor), regularization methods (e.g., ridge regression), decision trees, Bayesian methods (e.g., Naïve Bayes, Markov), kernel methods, probability, deterministics, genetic programs, support vectors, simulations (e.g., Monte Carlo simulations, cost estimation, etc.), pattern matching (e.g., matching patterns extracted from the read information with a known pattern associated with the adverse event), or any other suitable method to determine whether the adverse event has occurred and/or probability of the adverse event, wherein different analysis modules can use the same or different methodology. In a first example, the analysis module includes a set of heuristics or rules. In a second example, the analysis module includes a neural network, trained using a labeled dataset (e.g., including a true positive dataset labeled with adverse event occurrence and a true negative dataset labeled with adverse event nonoccurrence). However, the analysis module can be otherwise configured.

In some variations, the analysis modules are hosted on (and/or executed by) a remote computing system associated with the entity (e.g., a server system, an off-chain system), but can alternatively or additionally be hosted: on the same system hosting the cryptocurrency node, on the cryptocurrency network (e.g., as a smart contract), or on any other suitable computing system.

In some variations, the analysis modules are preferably executed according to a predetermined schedule (e.g., at the block creation rate for the monitored asset, the update frequency for the monitored source, etc.), but can alternatively or additionally be monitored when: a second analysis module calls the analysis module, information is received from one or more of the connected monitoring modules, when the analysis module is manually called, or at any other suitable time.

In some variations, analysis module execution includes: receiving values for a predetermined set of features and generating an output based on the analysis methods and the feature values. In one variation, analysis module execution includes: executing the connected monitoring modules and receiving the values from the connected monitoring modules (example shown in FIG. 4). In a second variation, analysis module execution includes: reading values for a predetermined set of features from a database populated by the monitoring modules. However, analysis module execution can be otherwise performed.

In some variations, the analysis modules are manually created (e.g., based on inputs that the respective algorithms need), but can alternatively or additionally be automatically created (e.g., from a predetermined module template, etc.), or otherwise created.

In some variations, the system includes a set of response modules (e.g., 141-142) that function to act upon the output of the analysis modules. Examples of actions that can be taken include: notifying a predetermined endpoint, increasing the confirmation time (e.g., increasing the number of blocks that need to be confirmed before a transaction can be marked as "confirmed"), ceasing interaction with the network (e.g., halting the cryptocurrency management system from sending transactions to the network, etc.; until the risk probability falls below a threshold probability), disconnecting from the cryptocurrency network (e.g., electrically or communicably disconnecting the respective node(s) from the cryptocurrency network and/or certain network endpoints), or any other suitable action.

In some variations, the response modules are executed (or triggered) in response to at least one of: a predetermined set of adverse events being detected, a predetermined set of adverse events being predicted, the risk of a given adverse event exceeding a predetermined risk threshold (e.g., wherein the risk threshold can be specific to the adverse event, generic for all adverse events, specific to the asset, specific to the adverse event class, etc.; example shown in FIG. 4), and upon any other suitable failure condition being met. The failure condition (e.g., risk threshold) can be: predetermined (e.g., static), selected from a chart or graph, calculated, or otherwise determined. When the failure condition is determined (e.g., calculated, selected, estimated, iteratively determined), the failure condition can be determined based on: the asset type, the analysis module type, the monitoring module type, parameter values from auxiliary sources (e.g., 103 shown in FIG. 1B) (e.g., energy costs), or otherwise determined.

In some variations, the response module (or response) that is executed upon failure condition satisfaction is determined based on: the analysis module generating the output indicative of a network failure or risk (e.g., wherein the analysis module is associated or connected to a predetermined set of response modules that are executed when the failure condition is met by the analysis module); the detected failure or risk type (e.g., wherein the risk type can be determined from or by the analysis module, and is associated with a predetermined set of response modules); the risk probability or severity (e.g., wherein different response modules are selected based on the risk probability value); or otherwise determined. In the variant wherein the analysis modules select which response modules should be executed, multiple analysis modules can be connected to (e.g., can select between) the same response modules. Additionally or alternatively, each analysis module can be associated with a separate and distinct response module.

In some variations, response parameters define a response to be performed by a response module. In some variations, response parameters for at least one response module (e.g., type, content, format, endpoint, duration, transmission frequency, repetition, failure conditions, etc.) can be predetermined (e.g., stored in the analysis module, stored in the response module, etc.), retrieved from a database (e.g., mapping the failure condition or parameters thereof to response parameters), selected from a chart or graph, calculated, or otherwise determined. When the response parameters are determined (e.g., calculated, selected, estimated, iteratively determined), the response parameters can be determined based on: the asset type, the analysis module type, the monitoring module type, parameter values from auxiliary sources (e.g., 103), the risk probability, the estimated loss from the failure, the estimated cost of the failure, or based on any other suitable variable.

In some variations, the system can optionally include: a set of notification endpoints that function to receive the response(s). In some implementations, notification endpoints include at least one of: a user, a user device, a user account, an Internet protocol address (IP address), a cryptocurrency address (e.g., a public key, a hash of a public key), or any other suitable endpoint. In some implementations, notification endpoints include at least one user device. The notification endpoints can be manually determined, automatically determined (e.g., be the endpoints associated with a cryptocurrency address associated with the entity; be the endpoints associated with the cryptocurrency nodes; etc.), or be otherwise determined.

Figure 2:
FIG. 2 is a schematic representation of a method.

In some variations, the system can optionally include a set of buffers connected to the set of monitoring modules, wherein the buffers function to store information read from the monitored source(s) to generate a historical record of the monitored source information (as shown in FIG. 1; examples shown in FIGS. 2 and 3). The buffers are preferably maintained on the same computing system as the analysis modules and/or monitoring modules, but can alternatively or additionally be maintained on: the cryptographic network (e.g., as a smart contract), a user device (e.g., smartphone, tablet, laptop, etc.), or any other suitable computing system.

In some variations, the system can include a single buffer used for multiple monitored sources, a different buffer for each monitored source (e.g., a different buffer for each cryptographic network or asset), a different buffer for each monitored source type (e.g., a different buffer for cryptographic networks vs. infrastructure information), or include any suitable number of buffers used in any suitable manner.

The buffers preferably store all or a subset of the output (e.g., monitoring information) of the monitoring modules, but can additionally or alternatively store all or a subset of the output of the analysis modules, or store any other suitable information. The buffers are preferably used by all or a subset of the analysis modules.

In one variation, the monitoring modules associated with a given analysis module can store monitoring information (e.g., in a time series) within a buffer, wherein the analysis module can retrieve said monitoring information from the buffer for analysis. For example, an analysis module can retrieve block information (e.g., transaction information within the block, block state, etc.) from the buffer once the block is orphaned. This can be particularly useful because once the block is orphaned on the on-network chain, the orphaned block is no longer stored.

In a second variation, the monitoring modules store a subset of the output information (monitoring information) in the buffer (e.g., identifiers for the latest blocks in the cryptocurrency network's blockchain) while supplying the output information to a first analysis module at a first time, wherein a second analysis module (separate from the first analysis module) can retrieve and analyze the stored information (e.g., determine a minimum block confirmation time) at a second time. In one example, block identifiers (output by a monitoring module) can be stored in the buffer and used to detect a chain reorganization by a first analysis module (e.g., in real or near-real time, wherein the first analysis module receives the block identifier information from the monitoring module and receives the historic block identifier information from the buffer), and used to determine a minimum confirmation time by a second analysis module (e.g., wherein the second analysis module determines the reorganization depth from the block identifiers stored in the buffer, such as by identifying the last common block identifier shared between the stored block identifiers and the on-network chain, and counting the number of blocks, appearing after the common block identifier, that are stored in the buffer but not appearing in the on-network chain). The minimum confirmation time can be: a linear multiple of the previous confirmation threshold, one more than the maximum or average number of confirmations on a chain before chain reorganization, or otherwise determined.

In a third variation, the analysis modules can modify the information stored in the buffer. For example, in the example above, the second analysis module can store the reorganization depth stored in the buffer as the confirmation time, and delete the block identifiers. However, the buffers can be otherwise used.

The buffers can store the information: indefinitely, until a deletion condition is met, or for any suitable period of time. Examples of the deletion condition include: an expiration period being met for a given piece of data, a manual deletion event, or any other suitable event. The expiration period can be: a universal time period, a time period specific to the data type, a time period specific to the monitoring module, a time period specific to the analysis module, a time period specific to the response module associated with the data, a predetermined number of confirmed blocks, or be any suitable expiration period.

In a first example, the system includes: a set of monitoring modules (e.g., 122, 124, 125 shown in FIG. 1B) that read the latest block information (e.g., last 1 block, last 10 blocks, etc.) off the nodes (e.g., 111, 112) for each of a plurality of cryptocurrency networks (e.g., 101, 102 shown in FIG. 1B) (e.g., at a block generation frequency); a set of buffers (e.g., 151) that store the read block information; an orphaned block module (e.g., analysis module 131 shown in FIG. 1B) that receives the latest block information from the monitoring modules (e.g., for one or more assets), compares the received block information against the block information stored in the buffer (e.g., for the same asset), and identifies an orphaned block in response to detection of a mismatch between the received block information and the stored block information (e.g., for said asset). The orphaned block module (e.g., 131) can trigger execution of a response module (e.g., 141 shown in FIG. 1B) when an orphaned block is detected, wherein the response module is configured to read the transaction information from the orphaned blocks (e.g., identified by the orphaned block module). In some implementations, the response module (e.g., 141) is configured to generate an alert based on the orphaned blocks' transaction information. The alert can trigger one or more downstream responses, such as re-sending the transaction information to the respective chain (e.g., via the respective node). The orphaned block module can optionally determine and store the reorganization depth (e.g., in an exchange operation parameter database), wherein the reorganization depth can be used to determine the number of confirmed blocks are required before a transaction, broadcast by the entity to the cryptocurrency network, can be marked as "confirmed." In some implementations, the response module (e.g., 141) is configured to set at least one operation parameter (e.g., the number of confirmed blocks that are required before a transaction can be marked as "confirmed") of for at least one cryptocurrency management system (e.g., 161, 162 shown in FIG. 1B). Additionally or alternatively, the orphaned block module can trigger execution of a second response module (e.g., 142) when no orphaned block is detected within a predetermined period of time (e.g., predetermined number of minutes, predetermined number of confirmation times, etc.), or perform any suitable set of functionalities.

In a second example, the system includes a set of monitoring modules that read contract information (e.g., ERC20 token contracts; wherein the information can be state, called functions, etc.) off the nodes for one or more cryptocurrency networks; a contract analysis module that anticipates or monitors token state changes based on the contract information; and a response module (e.g., 141, 142) that halts transaction broadcasting (e.g., by at least one cryptocurrency management system 161, 162) to the respective cryptocurrency network when a predetermined set of calls or contract states are outside of a predetermined range. The transactions can be resumed after the contract, token, or associated cryptocurrency network is validated (e.g., automatically, by a user, etc.).

In a third example, the system includes a set of monitoring modules that monitor key sections of the source code for the cryptocurrency protocol of one or more cryptocurrency networks (e.g., 101, 102) for changes. The monitoring modules can be connected to the code repository (e.g., Github), the node (e.g., 111, 112) for the cryptocurrency network (e.g., wherein the node has the protocol synchronized), or any other suitable monitored source. In one variation, the monitoring module reads the lines of code from the monitored source and feeds the read lines into the analysis module, wherein the analysis module (or buffer) stores the prior lines of code, compares the newly-received code with the prior code, and executes one or more response modules (e.g., 141, 142) in response to detection of a difference between the old and new code. One or more of the response modules can: halt transaction (e.g., by at least one cryptocurrency management system 161, 162) with the cryptocurrency network for which the changed code was detected, notify a predetermined endpoint to validate the cryptocurrency network, or perform any other suitable functionality. In a second variation, the monitoring module can detect the change in the code and send the change (and/or the new and old code) to the code analysis module, wherein the code analysis module can calculate an attack risk based on the change and trigger one or more response modules based on the risk probability.

In a fourth example, the system includes a set of monitoring modules that monitor each country's communication network health (e.g., Internet connectivity) and feed the connection metrics to the network analysis module. The network analysis module can compare the connection metrics against a predetermined value, compare the time series of connection metrics against a predetermined risk pattern, feed the connection metrics (and/or features extracted therefrom) into a trained neural network, or otherwise process the connection metrics to calculate a network partition risk and/or classify the network as being partitioned. In response to the network partition risk exceeding a predetermined threshold or network classification as being partitioned, the analysis module can execute one or more response modules that: halt transactions (e.g., by at least one cryptocurrency management system 161, 162) on cryptocurrency networks with large numbers of nodes or miners in the partitioned portion of the network (e.g., determined from a secondary monitoring module, analysis module, or a database), store blocks generated after the network partition is detected, generate a notification to a user account (e.g., wherein parameters of the notification are filled out based on the output of the analysis module), increase the number of confirmations required (e.g., by at least one cryptocurrency management system 161, 162) before a transaction can be marked as "confirmed" (e.g., based on the amount of time that the network was partitioned, be a predetermined number of confirmations, etc.), or execute any other suitable set of response modules.

In a fifth example, the system includes: a plurality of monitoring modules that monitor secondary (e.g., other) cryptocurrency addresses or resources (e.g., nodes), associated with a secondary (e.g., other) cryptocurrency management system (e.g., another exchange, such as Binance™), on each of a plurality of cryptocurrency networks; and an analysis module configured to detect when the secondary cryptocurrency management system is under attack on one or more cryptocurrency networks (e.g., large cryptocurrency amounts have been transferred to the secondary cryptocurrency addresses; the nodes associated with the secondary cryptocurrency management system have disappeared from the network; etc.). In response to attack detection (and/or the risk of attack exceeding a predetermined threshold), the analysis module can execute one or more response modules (e.g., 141, 142) that can: halt transactions (e.g., by at least one cryptocurrency management system 161, 162) to the cryptocurrency networks through which the secondary cryptocurrency management system is being attacked, notify an entity account, increase the number of confirmations before a transaction on the attacked cryptocurrency network by the sender is marked "confirmed" (e.g., by at least one cryptocurrency management system 161, 162), or otherwise act upon the predicted or detected attack.

In a sixth example, the system includes a first set of monitoring modules that monitor the entity's cryptocurrency address, a second set of monitoring modules that monitor sender addresses and associated mining power, and a third set of monitoring modules that monitor electrical power rates in the geographic regions associated with each sender address. The analysis module can ingest information from all three sets of monitoring modules, and determine a risk of attack based on: the transaction amount (e.g., cryptocurrency value transferred to the entity's cryptocurrency address), the mining power associated with the sender address, and the estimated attack cost to launch a successful attack on the entity (e.g., based on the cost of electricity, etc.). The analysis module can additionally or alternatively determine an estimated loss if the attack was successful (e.g., based on the transaction amount), and/or compare the estimated loss against a predetermined insured amount. The analysis module can call each monitoring module set serially (e.g., call the first set first, then call the second and third sets in response to the transaction amount exceeding a predetermined threshold), but can alternatively or additionally call the monitoring module sets in parallel, at random, or in any suitable order. The risk of attack can be determined by comparing the transaction amount with the estimated attack cost, by comparing the transaction amount and/or estimated attack cost with the amounts and/or costs for historic attacks, or otherwise determine the risk of attack on the entity. In response to the risk of attack exceeding a predetermined threshold, the analysis module can execute one or more response modules that can: halt transactions (e.g., by at least one cryptocurrency management system 161, 162) to addresses associated with the sender's address or user account (e.g., for a predetermined period of time, a predetermined number of confirmations, until the transaction is verified using a secondary off-chain mechanism, etc.), notify an entity account, increase the number of confirmations before a transaction by the sender is marked "confirmed" (e.g., by at least one cryptocurrency management system 161, 162), or otherwise act upon the high risk of attack. However, the system can include any suitable combination of modules, and operate in any suitable manner.

In some variations, at least one endpoint (e.g., 141-143) is communicatively coupled to at least one cryptocurrency management system (e.g., 161, 162). In some variations, at least one response module (e.g., 141, 142) is communicatively coupled to at least one cryptocurrency management system (e.g., 161, 162). In some variations, at least one cryptocurrency management system (e.g., 161, 162) is communicatively coupled to at least one cryptocurrency network (e.g., 101, 102) either directly, or indirectly via at least one node (e.g., 111, 112).

In some variations, the system 190 includes at least one node (e.g., 111-113). In some variations, the system 190 includes at least one cryptocurrency management system (e.g., 161, 162).

In some variations, the system 190 is a cryptocurrency monitoring system.

4. Method

FIG. 2 is a flowchart representation the method 200. In some variations, the method includes at least one of: determining at least one operating parameter for at least one cryptocurrency management system (S210); monitoring data (S220); generating analysis results (S230); and performing at least one action S240. In some variations the method 200 includes: monitoring data (S220); and generating analysis results (S230). In some variations, the method 200 includes: monitoring data (S220); generating analysis results (S230); and performing at least one action S240.

In some variations, the system 190 performs the method 200. In some variations, at least one component of the system 190 performs at least one of S210, S220, S230, and S240 of the method 200. In some implementations, S220 is performed by at least one monitoring module (e.g., 121-125). In some implementations, S230 is performed by at least one analysis module (e.g., 131-133). In some implementations, S240 is performed by at least one endpoint (e.g., 141-143). In some variations, endpoints include notification endpoints and response modules (e.g., 141, 142).

S210 functions to determine at least one operating parameter for at least one cryptocurrency management system (e.g., 161, 162). In some variations, cryptocurrency management systems include at least one of cryptocurrency wallets (e.g., hosted wallets), cryptocurrency exchanges, cryptocurrency payment systems, cryptocurrency custody systems, and the like. In some variations, cryptocurrency management systems include systems that interact (directly or indirectly) with a cryptocurrency network (e.g., 101, 102).

In some variations, S210 includes determining at least one risk parameter S211. In some variations, S211 includes determining a cryptocurrency risk threshold for at least one cryptocurrency management system (e.g., a wallet system, an exchange system, etc.). In some implementations, the cryptocurrency risk threshold identifies a number of transaction confirmations required to "confirm" a transaction by the cryptocurrency management system.

Figure 5:
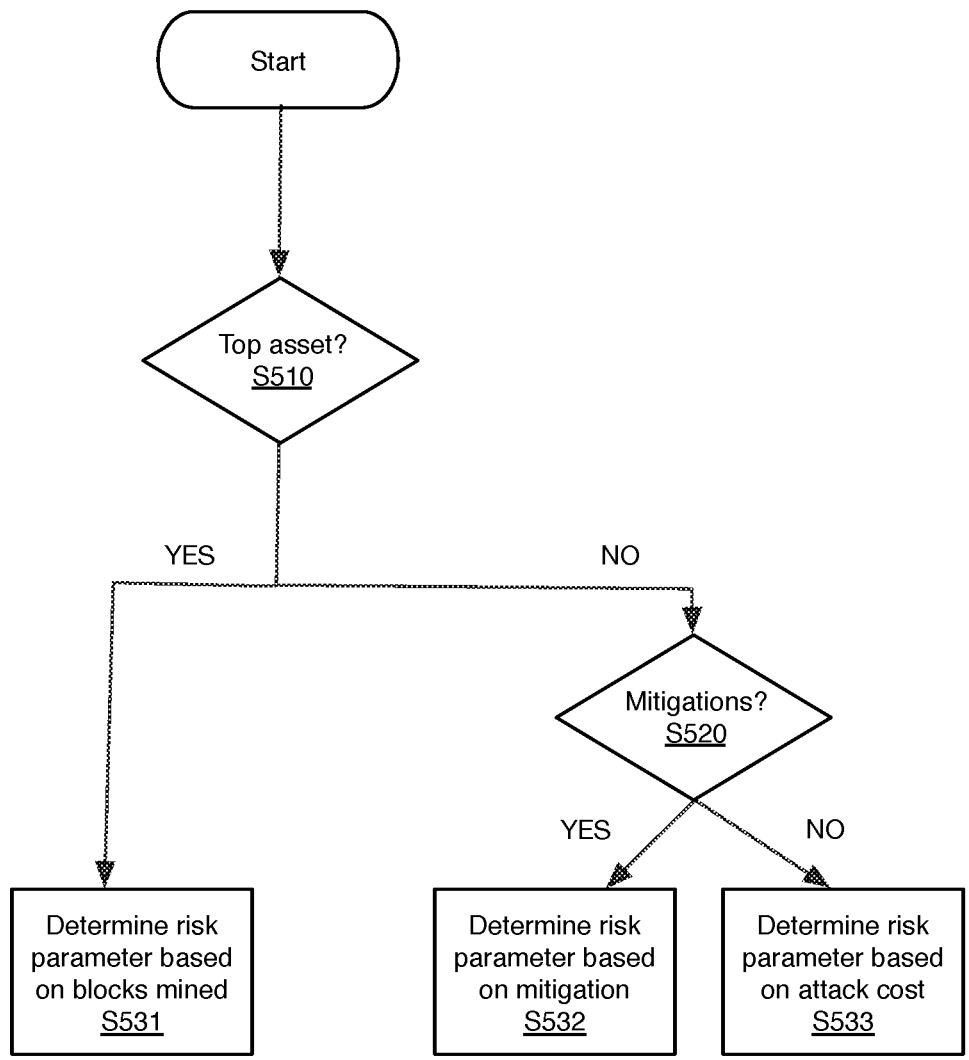
FIG. 5 is a schematic representation of decision tree.

In some variations, S211 includes at least one of: determining at least one risk parameter based on blocks mined (S531 shown in FIG. 5); determining at least one risk parameter based on mitigation (S532 shown in FIG. 5); and determining at least one risk parameter based on attack cost (S533 shown in FIG. 5).

In some variations, S531 is performed in response to determination that an asset associated with the risk parameter is a top asset ("YES" at S510). In some variations, S532 is performed in response to determination that an asset associated with the risk parameter is at not a top asset ("NO" at S510), and a determination that the system is constructed to mitigate at least one attack on a cryptocurrency network for the asset ("YES" at S520). In some variations, S533 is performed in response to determination that an asset associated with the risk parameter is not a top asset ("NO" at S510), and a determination that the system is not constructed to mitigate at least one attack on a cryptocurrency network for the asset ("NO" at S530).

In some variations, S510 includes determining whether an asset (whose risk parameter is being determined) is a dominant application for mining hardware (e.g., and/or whether the asset is primarily mined by application-specific integrated circuits (ASICs)). In these variations, an asset is considered a top asset when the asset is the dominant application for the hardware. For example, mining hardware (e.g., a SHA256d ASIC) can execute mining applications for several cryptocurrency assets, such as, for example, Bitcoin (BTC), Bitcoin SV (BSV), etc., with one of the mining applications being the domination application for the mining hardware. Examples of mining hardware include SHA256d ASICs, and SCRYPT ASICs. BTC is typically the dominant asset for SHA256d ASICs, and Litecoin (LTC) is typically the dominant asset for SCRYPT ASICs.

In some variations, S510 includes grouping assets by hash type, and for each hash type, determining a dominant asset (top asset). In some implementations, determining a dominant asset for a hash type includes: comparing at least one of market capitalization and hash rate for assets of the hash type. In some implementations, an asset with a highest market capitalization is the dominant asset for the hash type. In some implementations, an asset with a highest hash rate is the dominant asset for the hash type. In some implementations, for each asset a result is calculated based on market capitalization and hash rate, and an asset with a highest result is the dominant asset for the hash type. However, the top asset can be otherwise determined.

In some variations, S520 includes determining, whether the system is configured to perform at least one attack mitigation process for at least one attack on a cryptocurrency network of an asset whose risk parameter is being determined. In some variations, attack mitigation processes include attack mitigation processes to mitigate against a 51% attack.

In some variations, S531 includes determining at least one risk parameter based on the number of blocks that can be mined by a hardware miner (e.g., an ASIC) during a specified duration of time. In some implementations, the number of blocks mined is a maximum number of blocks that can be mined for the asset using a hardware miner (e.g., an ASIC). In some variations, the risk parameter is a "number of transaction confirmations" (confirmation requirement) parameter, and S531 includes determining the number of confirmations based on the number of blocks that can be mined during the specified duration of time for the asset and/or a reference asset (e.g., different from the asset being analyzed). In some implementations, the number of confirmations is a number of blocks that can be mined within the duration of time. In an example, the duration of time is one hour; however, any other suitable time duration can be used. For example, if six Bitcoin blocks can be mined in one hour, then the number of confirmations is set to six. Other examples of reference assets that can be used include: Ethereum (e.g., 250 blocks per hour), LTC (e.g., 24 blocks per hour; 48 blocks per 2 hours); and/or any other suitable hash type and/or asset. Additionally or alternatively, the number of confirmations can be a predetermined number (e.g., 6, 10, 50), be otherwise calculated (e.g., based on cost, risk probability, etc.), and/or be otherwise determined.

In some implementations, a one hour duration of time represents a high bar for an attacker, since the attacker must control more than half of all hardware that mines the asset for an hour.

In some variations, S532 includes: determining at least one risk parameter based on information identifying an effectiveness of a mitigation process performed by the system (and/or the asset or respective cryptocurrency protocol). In some variations, S532 includes: determining at least one risk parameter based on information identifying an effectiveness of a mitigation process performed by the system (and/or the asset or respective cryptocurrency protocol) to mitigate against a 51% attack. In some variations, the risk parameter is a "number of transaction confirmations" parameter, and S532 includes determining "number of transaction confirmations" parameter based on information identifying an effectiveness of a mitigation process performed by the system to mitigate against a 51% attack. In other variations, S532 includes: determining a 51% attack mitigation parameter value for the asset (e.g., number of blocks used in the asset's checkpointing protocol) and setting the risk parameter (threshold parameter) to a stricter or higher value than the asset's 51% attack mitigation parameter value. For example, if the system has a 10 block checkpointing system for Bitcoin Cash (BCH), the "number of transaction confirmations" parameter is set to 12 blocks to be just over the 10 block checkpointing threshold. In some variations, the system receives information identifying the effectiveness of a mitigation process (directly or indirectly) via a user interface. In other variations, the effectiveness of a mitigation process can be determined using closed-loop feedback of the system (e.g., wherein the mitigation process efficacy is determined based on historical successful and/or unsuccessful attacks detected by the system).

In some variations, S533 includes determining at least one risk parameter based on attack cost of a 51% attack.

In some variations, S533 includes determining a "number of transaction confirmations" parameter based on attack cost. In some variations, S533 includes setting the "number of transaction confirmations" parameter to a number of blocks that have an equivalent cost to mine as an attack on the asset. In some variations, S533 includes setting the "number of transaction confirmations" parameter to a number of blocks that have an equivalent cost to mine as an attack on the dominant asset of the mining hardware. However, the cost can be set at an insurance threshold, a predetermined value, and/or otherwise determined. In some implementations, the attack cost is a 51% attack cost. In some implementations, the attack is an attack for a specified duration. In some implementations, the duration is one hour. However, in some implementations, any other suitable duration can be used.

In some implementations, the attack is a one hour 51% attack for the dominant asset of the mining hardware.

In some implementations, the "number of transaction confirmations" parameter is determined as shown below in Equation 1.

$$C=C^d*(B^d*R^d*P^d)/(B*R*P) \quad \text{Equation 1}$$

As shown in Equation 1, $C^d$ is the dominant asset number of confirmations; $B^d$ is the dominant asset blocks per hour; $R^d$ is the dominant asset block reward; $P^d$ is the dominant asset price; B is the current asset blocks per hour; R is the current asset block reward; and P is the current asset price.

For example, the number of transaction confirmations" ($C^{BSV}$) for BSV (Bitcoin SV) can be calculated based on the 51% attack cost of the dominant coin in the hardware class (e.g., BTC) as follows:

$$C^{BSV}=6*(6*12.5*\$3958)/(6*12.5*\$67.55)=352$$

In some variations, S211 includes determining at least one risk parameter for a first exchange system based on risk parameters used by at least one other exchange system. In some implementations, S211 includes maintaining an of risk parameters information (e.g., "number of transaction confirmations") that includes risk parameter values of a defined list of other exchanges, and setting a risk parameter of an exchange (e.g., 161) based on a risk parameter information. In some implementations, S211 includes setting a "number of transaction confirmations" of an exchange (e.g., 161) to be a multiple of a median of the "number of transaction confirmations" values identified in the risk parameters information.

Returning to FIG. 2, in some variations, S533 includes determining a "number of transaction confirmations" parameter based on likelihood of attack blow a threshold number of transaction confirmations.

In some variations, S533 includes determining a "number of transaction confirmations" parameter based on how often orphan blocks occur, as identified the cryptocurrency network (or information obtained by monitoring the cryptocurrency network).

S220 functions to monitor data and generate monitoring information. In some implementations, S220 is performed by at least one monitoring module (e.g., 121-125). In some implementations, S220 is performed by at least one analysis module (e.g., 131-133). In some implementations, S220 is performed by at least one node (e.g., 111-112). In some variations, S220 includes monitoring blockchain data (S221). In some variations, at least one monitoring module (e.g., 122, 124, 125) performs S221. In some variations, S220 includes monitoring auxiliary data (S222). In some variations, at least one monitoring module (e.g., 121) performs S222. In some implementations, a gateway (e.g., 114) is used to monitor auxiliary data provided by an auxiliary source (e.g., 103 shown in FIG. 1B), wherein the auxiliary source is not a cryptocurrency network.

In some variations, S220 includes generating monitoring information for one cryptocurrency network (e.g., 111). In some variations, S220 includes generating monitoring information for a plurality of cryptocurrency networks (e.g., 111 and 112). In some implementations, monitoring information includes monitoring information for at least one cryptocurrency network (e.g., 101, 102). In some implementations, monitoring information for at least one cryptocurrency network includes at least one of: a block hash for a block included in a blockchain of the cryptocurrency network; a parent hash for a block included in a blockchain of the cryptocurrency network; a time stamp for a block included in a blockchain of the cryptocurrency network; a time stamp for a transaction included in a block included in a blockchain of the cryptocurrency network; a block size of a block included in a blockchain of the cryptocurrency network; and a transaction count for a block included in a blockchain of the cryptocurrency network.

S230 functions to generate analysis results. In some implementations, S230 is performed by at least one analysis module (e.g., 131-133). In some variations, S230 includes generating analysis results based on monitoring information generated at S220. In some variations, S230 includes generating analysis results based on monitoring information for one cryptocurrency network. In some variations, S230 includes generating analysis results based on monitoring information for a plurality of cryptocurrency networks. In some variations, S230 includes generating analysis results based on auxiliary data obtained by monitoring at least one auxiliary source (e.g., 103), and monitoring information for at least one cryptocurrency network.

In some variations, S230 includes generating at least one alert.

In some variations, S230 includes at least one of: generating a fork detection alert S231; generating a slow chain alert S232; generating a fast chain alert S233; generating a reorganization alert S234; generating a double spend alert S235; generating a quorum change alert S236; generating a Unique Node List (UNL) change alert S237; generating an "empty blocks" alert S238; and generating a dangerous invocation alert S239.

In some variations, S231 (fork detection alert) includes generating an alert if a blockchain network is partitioned (e.g., due to implementation consensus failure, eclipse attack (blockchain-specific attack on nodes), or connectivity issues in the wider internet such as a BGP hijack that partitions the network, and the like).

In some variations, S232 (slow chain alert) includes generating an alert if a blockchain network fails to produce blocks at a rate within a user configurable tolerance, which could indicate the possibility of hash power shifts (e.g., unique to cryptocurrency threats) or staking consensus failures.

In some variations, S233 (fast chain alert) includes generating an alert if a blockchain network produces blocks at a rate exceeding a user configurable tolerance, which would indicate a possible hashpower based attack or a failure of the consensus rules.

In some variations, S234 (reorganization alert) includes generating an alert if a blockchain has a significant number of blocks replaced by new blocks (e.g., which can be indicative of a 51% attack).

In some variations, S235 (double spend alert) includes scanning the blockchain following a reorganization to determine if any blockchain transactions, which have various forms (specifically UTXO and account format), were double spends, and generating an alert if any blockchain transactions were double spends.

In some variations, S236 (quorum change alert) includes scanning a trust-based blockchain to determine trust flows and whether there are significant changes, which would indicate a single actor is capable of subverting the proper functioning of the network, and generating an alert if significant changes are identified.

In some variations, S237 (UNL change alert) includes scanning a trust-based blockchain to identify a Unique Node List and determine whether there are significant changes to the UNL, which would indicate a single actor is capable of subverting the proper functioning of the network, and generating an alert if significant changes are identified.

In some variations, S238 (empty blocks alert) includes generating an alert if a blockchain fails to include transactions in blocks within a threshold specified by the user, which is indicative of blockchain instability or consensus failure.

In some variations, S239 (dangerous invocation alert) includes generating an alert if any smart contract functions defined by users as dangerous are successfully invoked, indicating a state change in the contract that could subvert expected functioning.

S240 functions to perform at least one action.

In some variations, S240 includes controlling at least one cryptocurrency management system (e.g., 161, 162) based on at least one of: the monitoring information generated at S220, and the analysis results generated at S230.

In some variations, S240 includes providing at least one alert (S241). In some implementations, S241 includes providing at least one alert to a user device. In some implementations, S241 includes providing at least one alert to a cryptocurrency management system (e.g., 161, 162). In some implementations, S241 includes generating at least one alert. In some implementations, S241 includes providing at least one alert generated at S230.

In some variations, S240 includes setting at least one operation parameter for at least one cryptocurrency management system (e.g., 161, 162 shown in FIG. 1B) (S242). In some implementations, setting at least one operating parameter includes setting an initial operating parameter. In some implementations, setting at least one operating parameter includes updating an existing operating parameter (e.g., updating an operating parameter determined at S210). In some variations, at least one operation parameter is set based on the monitoring information generated at S220. In some variations, at least one operation parameter is set based on the analysis results generated at S230.

In some variations, S242 includes setting at least one risk parameter for at least one cryptocurrency management system (S242a).

In some variations, risk parameters include at least one cryptocurrency risk threshold. In some implementations, a cryptocurrency risk threshold identifies a number of transaction confirmations required to "confirm" a transaction by the cryptocurrency management system (e.g., a wallet system, an exchange system, etc.). In examples, a transaction is considered "confirmed" once the risk of a fork or attack has fallen below a predetermined threshold, or otherwise determined. In examples, the asset can be released to an end user (e.g., made available to the end user, transactable through a platform hot wallet, etc.) once the transaction is considered "confirmed." However, any other suitable action can be performed in response to the transaction being marked "confirmed."

In some variations, S242a functions to automatically adjust a risk threshold for receiving cryptocurrency by automatically increasing a transaction confirmation requirement that identifies a number of transaction confirmations needed to identify a transaction as a "confirmed" transaction.

In some variations, S242a includes automatically increasing a transaction confirmation requirement in response to at least one of: a fork detection alert; a slow chain alert, a fast chain alert, a reorganization alert; a double spend alert; a quorum change alert; a UNL change alert; an empty blocks alert; a dangerous invocation alert; and/or any other suitable event or alert.

In some variations, S240 includes disabling functionality (S243). In some implementations, S243 includes disabling functionality of at least one cryptocurrency management system (e.g., 161, 162). In some variations, S243 functions to generate a list of disabled cryptocurrency wallet functionality (e.g., a "Halt List"), wherein transactions to a cryptocurrency network (e.g., 101, 102) on the halt list (or addresses/accounts identified by the hot list) are blocked. In some variations, S243 functions to control at least one cryptocurrency wallet (e.g., 161, 162) to disable wallet functionality (e.g., sending transactions); in this manner, impact of an active attack can be reduced.

In some variations, S243 includes at least one of: disabling broadcasting of cryptocurrency transactions to at least one cryptocurrency network; disabling broadcasting of cryptocurrency transactions that identify a specified cryptocurrency address as a destination; disabling broadcasting of cryptocurrency transactions that identify a specified cryptocurrency account as a destination; and disabling the cryptocurrency signing service that maintains the public key material necessary for creating valid cryptocurrency transactions.

In some variations, S243 includes disabling functionality of at least one cryptocurrency management system (e.g., 161, 162) in response to at least one of: a fork detection alert; a slow chain alert, a fast chain alert, a reorganization alert; a double spend alert; a quorum change alert; a UNL change alert; an empty blocks alert; and a dangerous invocation alert.

5. System Architecture

In some variations, the system 190 is implemented as a single hardware device 600. In some embodiments, the system 190 is implemented as a plurality of hardware devices (e.g., 600). In some variations, a hardware device implementing the system 190 includes a bus 601 that interfaces with processors 603A-N, a main memory 622 (e.g., a random access memory (RAM)), a read only memory (ROM) 604, a processor-readable storage medium 605, and a network device 611. In some variations, bus 601 interfaces with at least one of a display device 691 and a user input device 692.

In some variations, the processors 603A-603N include one or more of an ARM processor, an X86 processor, a GPU (Graphics Processing Unit), a tensor processing unit (TPU), and the like. In some variations, at least one of the processors includes at least one arithmetic logic unit (ALU) that supports a SIMD (Single Instruction Multiple Data) system that provides native support for multiply and accumulate operations.

In some variations, at least one of a central processing unit (processor), a GPU, and a multi-processor unit (MPU) is included.

In some variations, the processors and the main memory form a processing unit 699. In some variations, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some variations, the processing unit is an ASIC (Application-Specific Integrated Circuit). In some variations, the processing unit is a SoC (System-on-Chip).

In some variations, the processing unit includes at least one arithmetic logic unit (ALU) that supports a SIMD (Single Instruction Multiple Data) system that provides native support for multiply and accumulate operations. In some variations the processing unit is a Central Processing Unit such as an Intel processor.

In some variations, network device 611 provides one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like.

Machine-executable instructions in software programs (such as an operating system, application programs, and device drivers) are loaded into the memory (of the processing unit) from the processor-readable storage medium, the ROM or any other storage location. During execution of these software programs, the respective machine-executable instructions are accessed by at least one of processors (of the processing unit) via the bus, and then executed by at least one of processors. Data used by the software programs are also stored in the memory, and such data is accessed by at least one of processors during execution of the machine-executable instructions of the software programs. The processor-readable storage medium 605 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like.

In some variations, the storage medium 605 includes machine-executable instructions for at least one of: an operating system 630, applications 613, device drivers 614, monitoring modules 615 (e.g., 121-125), analysis modules 616 (e.g., 131-133), endpoint modules 617 (e.g., 141-143), a cryptocurrency management system 618 (e.g., 161, 162), a monitored source 619 (e.g., 111-114), and a buffer 620 (e.g., 151).

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising: with a cryptocurrency monitoring system:
    generating cryptocurrency monitoring information by monitoring blockchain data for at least one cryptocurrency network;
    generating analysis results by processing the generated monitoring information;
    controlling a cryptocurrency management system based on at least one of the monitoring information and the analysis results,
    wherein controlling the cryptocurrency management system comprises at least one of:
        setting at least one operation parameter of the cryptocurrency management system, and
        disabling functionality of the cryptocurrency management system.

2. The method of claim 1, wherein the cryptocurrency management system includes at least one of a cryptocurrency wallet and a cryptocurrency exchange.

3. The method of claim 2,
    wherein controlling the cryptocurrency management system comprises setting at least one operation parameter, and
    wherein setting at least one operation parameter comprises: setting a risk parameter.

4. The method of claim 3, wherein the risk parameter is a transaction confirmation requirement parameter.

5. The method of claim 2,
    wherein controlling the cryptocurrency management system comprises disabling functionality of the cryptocurrency management system, and
    wherein disabling functionality of the cryptocurrency management system comprises at least one of:
        disabling broadcasting of cryptocurrency transactions to at least one cryptocurrency network,
        disabling broadcasting of cryptocurrency transactions that identify a specified cryptocurrency address as a destination, and
        disabling broadcasting of cryptocurrency transactions that identify a specified cryptocurrency account as a destination.

6. The method of claim 2, wherein blockchain data for a cryptocurrency network includes at least one of: a block hash for a block included in a blockchain of the cryptocurrency network; a parent hash for a block included in a blockchain of the cryptocurrency network; a time stamp for a block included in a blockchain of the cryptocurrency network; a block size of a block included in a blockchain of the cryptocurrency network; and a transaction count for a block included in a blockchain of the cryptocurrency network.

7. The method of claim 6, wherein generating monitoring information comprises generating monitoring information for a plurality of cryptocurrency networks by monitoring blockchain data for each network included in the plurality of cryptocurrency networks.

8. The method of claim 7, wherein generating monitoring information comprises: generating monitoring information by monitoring auxiliary data provided by at least one auxiliary source that is different from a cryptocurrency network.

9. The method of claim 7, wherein generating analysis results comprises:
    generating a fork detection alert.

10. The method of claim 7, wherein generating analysis results comprises:
    generating a slow chain alert.

11. The method of claim 7, wherein generating analysis results comprises:
    generating a fast chain alert.

12. The method of claim 7, wherein generating analysis results comprises:
    generating a reorganization alert.

13. The method of claim 7, wherein generating analysis results comprises:
    generating a double spend alert.

14. The method of claim 7, wherein generating analysis results comprises:
    generating a quorum change alert.

15. The method of claim 7, wherein generating analysis results comprises:
generating a Unique Node List change alert.

16. The method of claim 7, wherein generating analysis results comprises:
generating an empty blocks alert.

17. The method of claim 7, wherein generating analysis results comprises:
generating a dangerous invocation alert.

18. A cryptocurrency monitoring system comprising:
a plurality of monitoring modules communicatively coupled to at least one node of a cryptocurrency network;
an analysis module communicatively coupled to an output of at least one of the plurality of monitoring modules;
a response module communicatively coupled to an output of the analysis module, and communicatively coupled to a cryptocurrency management system,
wherein each of the monitoring modules are constructed to: generate cryptocurrency monitoring information by monitoring blockchain data for at least one cryptocurrency network,
wherein the analysis module is constructed to generate analysis results by processing the generated monitoring information,
wherein the response module is constructed to control a cryptocurrency management system based on at least one of the monitoring information and the analysis results,
wherein controlling the cryptocurrency management system comprises at least one of:
setting at least one operation parameter of the cryptocurrency management system, and
disabling functionality of the cryptocurrency management system.

19. The system of claim 18,
wherein the response module is constructed to set at least one confirmation requirement parameter for the cryptocurrency management system based on at least one of the monitoring information and the analysis results.

20. The system of claim 18,
wherein the response module is constructed disable functionality of the cryptocurrency management system, wherein disabling functionality comprises at least one of:
disabling broadcasting of cryptocurrency transactions to at least one cryptocurrency network,
disabling broadcasting of cryptocurrency transactions that identify a specified cryptocurrency address as a destination, and
disabling broadcasting of cryptocurrency transactions that identify a specified cryptocurrency account as a destination.

* * * * *